United States Patent
Gelay et al.

(10) Patent No.: US 9,477,856 B2
(45) Date of Patent: *Oct. 25, 2016

(54) SYSTEM HAVING AN IMPROVED USER INTERFACE FOR READING CODE SYMBOLS

(71) Applicant: Hand Held Products, Inc., Fort Mill, SC (US)

(72) Inventors: Geoffrey Gelay, West Deptford, NJ (US); Robert Michael Hussey, Waxhaw, NC (US); Bhishma Thakkar, Huntingdon Valley, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,389

(22) Filed: Jan. 8, 2016

(65) Prior Publication Data

US 2016/0117528 A1  Apr. 28, 2016

Related U.S. Application Data

(63) Continuation of application No. 14/642,830, filed on Mar. 10, 2015, now Pat. No. 9,235,737, which is a continuation of application No. 13/930,913, filed on Jun. 28, 2013, now Pat. No. 8,985,461.

(51) Int. Cl.
*G06K 7/015* (2006.01)
*G06K 7/10* (2006.01)
*G06K 7/14* (2006.01)

(52) U.S. Cl.
CPC ............. *G06K 7/015* (2013.01); *G06K 7/1095* (2013.01); *G06K 7/10722* (2013.01); *G06K 7/10821* (2013.01); *G06K 7/1439* (2013.01); *G06K 7/14* (2013.01)

(58) Field of Classification Search
CPC .................................................. G06K 7/015
USPC ........................................ 235/462.2, 462.11
See application file for complete search history.

(56) References Cited

U.S. PATENT DOCUMENTS

| | | | |
|---|---|---|---|
| 8,437,530 B1* | 5/2013 | Mennie | G07F 19/20 209/534 |
| 2005/0103850 A1* | 5/2005 | Mergenthaler | G06K 7/1096 235/462.08 |
| 2006/0010042 A1* | 1/2006 | Gianakis | G06Q 30/06 705/27.1 |
| 2011/0310271 A1* | 12/2011 | Yamashita | H04N 5/2351 348/229.1 |
| 2013/0027757 A1* | 1/2013 | Lee | H04N 1/387 358/450 |
| 2013/0121468 A1* | 5/2013 | Ohta | A61B 6/4405 378/63 |
| 2013/0126615 A1* | 5/2013 | McCloskey | G06K 7/10851 235/462.25 |
| 2013/0135198 A1* | 5/2013 | Hodge | G06F 3/013 345/156 |
| 2013/0181053 A1* | 7/2013 | Harris | G06K 19/06028 235/462.11 |
| 2013/0194192 A1* | 8/2013 | Andolina | G06K 9/186 345/173 |
| 2014/0027517 A1* | 1/2014 | Gu | H04M 1/72522 235/462.06 |

* cited by examiner

*Primary Examiner* — Allyson Trail
(74) *Attorney, Agent, or Firm* — Additon, Higgins & Pendleton, P.A.

(57) ABSTRACT

A system for reading code symbols includes a camera, a user interface system, and a processor communicatively coupled to the camera and the user interface system. The user interface system includes a visual display. The processor is configured for (i) capturing an image including a code symbol, (ii) displaying the image on the visual display, (iii) determining whether the code symbol in the image is readable by the processor, and (iv) displaying on the visual display a positive indicator overlaying the code symbol in the image when the processor determines that the code symbol in the image is readable by the processor. The processor is further configured for reading the code symbol in the image in response to a selection input received from the user interface system.

20 Claims, 3 Drawing Sheets

SYSTEM HAVING AN IMPROVED USER INTERFACE FOR READING CODE SYMBOLS

CROSS-REFERENCE TO RELATED APPLICATION

The present application claims the benefit of U.S. patent application Ser. No. 14/642,830 for a System Having an Improved User Interface for Reading Code Symbols filed Mar. 10, 2015 (and published Jun. 25, 2015 as U.S. Patent Publication No. 2015/0178523), now U.S. Pat. No. 9,235,737, which claims the benefit of U.S. patent application Ser. No. 13/930,913 for a Mobile Device Having an Improved User Interface for Reading Code Symbols filed Jun. 28, 2013 (and published Jan. 1, 2015 as U.S. Patent Application Publication No. 2015/0001302), now U.S. Pat. No. 8,985,461. Each of the foregoing patent applications, patent publications, and patents is hereby incorporated by reference in its entirety.

FIELD OF THE INVENTION

The present disclosure generally relates to the field of mobile devices. More specifically, the present disclosure relates to mobile devices having an improved user interface for reading code symbols.

BACKGROUND

Over the past forty years, businesses have sought to maximize efficiency by using various devices to automate data entry. In the important area of inventory management, in particular, the symbol reading device (e.g., barcode reader, barcode scanner or RFID reader) has greatly reduced the time and errors inherent to manual data entry. Symbol reading devices are often employed to decode barcodes. A barcode is a machine-readable representation of information in graphic format. Traditionally, a barcode is a series of parallel bars and spaces of varying widths (e.g., a linear barcode or 1D barcode). More recently, there has been an increase in the use of alternatives to the linear barcode, for example matrix codes (e.g., 2D barcodes, QR Code, Aztec Code, Data Matrix) and Optical Character Recognition (OCR) have enjoyed increasing popularity as the technology advances. As used herein, the terms barcode and code symbol are intended in their broadest sense to include linear barcodes, matrix barcodes, and OCR-enabled labels. Barcode readers (e.g., optical readers) tend to fall into one of three categories: wand readers, laser scan engine barcode readers, and image sensor based barcode readers.

Wand readers generally comprise a single light source and single photodetector housed in a pen shaped housing. A user drags the wand reader across a decodable symbol (e.g., a barcode) and a signal is generated representative of the bar space pattern of the barcode.

Laser scan engine based barcode readers comprise a laser diode assembly generating a laser light beam and a moving mirror for sweeping the laser light beam across a decodable symbol, wherein a signal is generated corresponding to the decodable symbol.

Image sensor based barcode readers comprise multi element image sensors such as CID, CMOS, or CCD image sensors and an imaging optic for focusing an image onto the image sensor. In the operation of an image sensor based barcode reader, an image of a decodable symbol is focused on an image sensor and a signal is generated corresponding to the signal. Image sensor elements may be arrayed in a line or in a rectangular matrix or area. Area image sensors capture a digital picture and use software algorithms to find and decode one or more symbols.

Users of laser scanner engine based barcode readers have been switching in increasing numbers to image sensor based barcode readers. Image sensor based barcode readers are more durable and offer additional features relative to laser scan engine based barcode readers. Features and functions which have been incorporated into image sensor based barcode readers involve image processing.

Exemplary optical readers are described in U.S. Pat. No. 6,298,176; U.S. Pat. No. 7,159,783; and U.S. Pat. No. 7,413,127; each of which is hereby incorporated by reference in its entirety.

Recently, the widespread availability of mobile devices such as smartphones and tablet computers, and their continually improving functionality, has led businesses and consumers alike to employ these mobile devices as code symbol readers. In this regard, smartphones and tablet computers typically have an internal video camera that can be employed for image scanning.

Unlike conventional symbol reading devices, which typically have an aiming indicator that can be projected onto a code symbol (e.g., barcode, linear barcode, matrix barcode, letter strings, number strings) with an LED or laser, smartphones and tablet computers typically lack a built-in aiming indicator. Accordingly, decoding software for smartphones and tablet computers typically utilizes a user interface with a real-time display from the internal video camera to aid users in aiming at the code symbol. A continuous graphic pattern is typically overlaid on the real-time display to further aid with aiming. For example, a horizontal line that mimics a laser scan line may be painted on the display, so that a user can orient the device so that the horizontal line cuts through the barcode. Alternatively, a graphic pattern delimiting a reduced region of interest may be painted on the display, so that a user can position the barcode within the region of interest. In addition to lacking a satisfactory way to direct the aim of the scanning operation of the mobile device, mobile devices also lack an intuitive trigger to activate the scanning operation. Typically, scanning is initiated whenever a readable barcode enters the mobile device's field of view in a proper orientation. When multiple barcodes are in the field of view, however, it can lead to user confusion about which barcode was actually scanned. Accordingly, a need exists for a mobile device with an improved user interface for code symbol reading.

SUMMARY

The present invention embraces a mobile device (e.g., smartphone, tablet computer) that includes a camera, a user interface system having a visual display, and a processor. The processor is communicatively coupled to the camera and the user interface system. The processor is configured for capturing from the camera an image depicting a code symbol; displaying the image on the visual display; and determining whether the code symbol in the image is readable by the processor. The processor is further configured for displaying on the visual display a positive indicator overlaying the code symbol in the image when the processor determines that the code symbol in the image is readable by the processor.

In another aspect, the disclosure embraces a method of reading a code symbol with a mobile device. A mobile device is provided. The mobile device includes a camera, a user interface system having a visual display, and a processor communicatively coupled to the camera and the user interface system. An image that includes a code symbol is captured with the camera. The image is displayed on the visual display. The processor determines whether the code symbol is readable by the processor. When the processor determines that the code symbol is readable by the processor, a positive indicator is displayed on the display screen overlaying the code symbol.

An object of the present disclosure is to provide a mobile device having an improved user interface for code symbol reading.

Another object of the present disclosure is to provide a mobile device having a user interface that simplifies the selection of the code symbol that the user desires to decode.

Another object of the present disclosure is to provide a mobile device having an improved user interface that automatically indicates to the user whether a code symbol is readable.

Another object of the present disclosure is to provide a mobile device having an improved user interface featuring an intuitive means of selecting a code symbol.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

To more fully understand the objects of the disclosure, the following detailed description of the illustrative embodiments should be read in conjunction with the accompanying drawings, wherein.

DETAILED DESCRIPTION

The present invention embraces a mobile device (e.g., cellular phone, smartphone, tablet device, personal digital assistant, portable computer, vehicle-mount computer) having an improved user interface for reading code symbols. The mobile device according to the present disclosure includes a camera, a user interface system having a visual display, and a processor. The processor is communicatively coupled to the camera and the user interface system. The processor is configured for capturing from the camera an image depicting a code symbol; displaying the image on the visual display; and determining whether the code symbol in the image is readable by the processor. The processor is further configured for displaying on the visual display a positive indicator overlaying the code symbol in the image when the processor determines that the code symbol in the image is readable by the processor.

Figure 1:
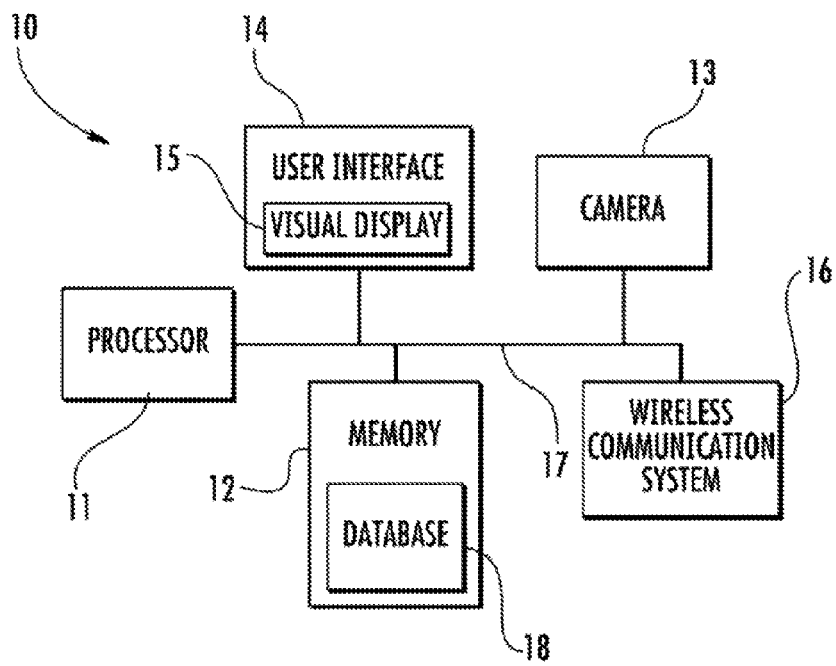
FIG. 1 is a schematic block diagram of an exemplary mobile device according to the present disclosure.
Figure 2:
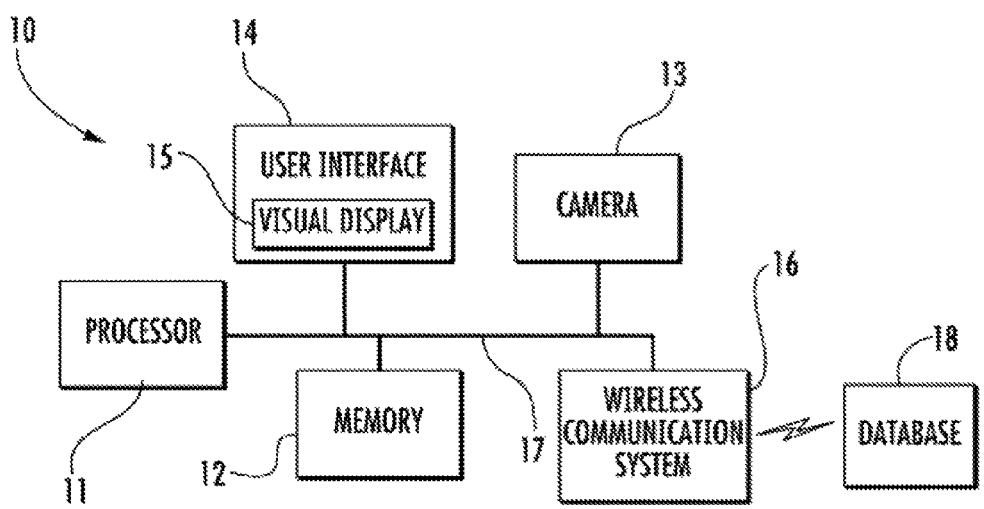
FIG. 2 is a schematic block diagram of an alternative embodiment of an exemplary mobile device according to the present disclosure.
Figure 3:
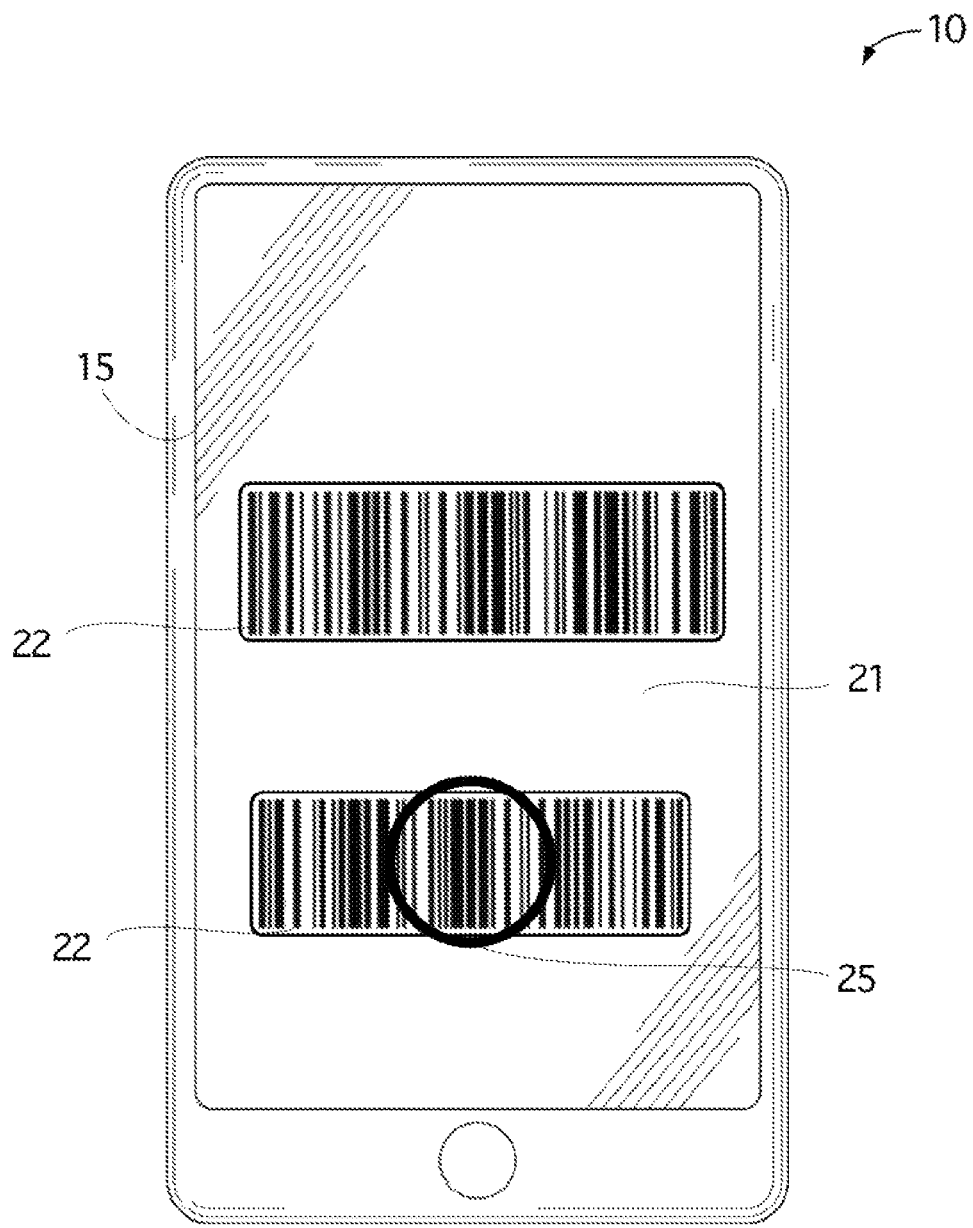
FIG. 3 is a graphic depiction of a user interface of a mobile device according to the present disclosure.

FIGS. 1 and 2 schematically depict two exemplary mobile devices 10 in accordance with the present disclosure. The mobile device 10 typically includes a processor 11, a memory 12, a camera 13, a user interface 14, and a wireless communication system 16. The processor 11 is communicatively coupled to the memory 12, the camera 13, the user interface 14, and the wireless communication system 16.

Exemplary mobile devices may include a system bus 17 and/or one or more interface circuits (not shown) for coupling the processor 11 and other components to the system bus 17. In this regard, the processor 11 may be communicatively coupled to each of the other components via the system bus 17 and/or the interface circuits. Similarly, the other components (e.g., the memory 12, the camera 13, the user interface 14, and the wireless communication system 16) may each be communicatively coupled to other components via the system bus 17 and/or the interface circuits. Other embodiments of system bus architecture providing for efficient data transfer and/or communication between the components of the device may also be employed in exemplary embodiments in accordance with the present disclosure.

Typically, the processor 11 is configured to execute instructions and to carry out operations associated with the mobile device 10. For example, using instructions retrieved from the memory 12 (e.g., a memory block), the processor 11 may control the reception and manipulation of input and output data between components of the mobile device 10. The processor 11 typically operates with an operating system to execute computer code and produce and use data. The operating system, other computer code, and data may reside within the memory 12 that is operatively coupled to the processor 11. The memory 12 generally provides a place to store computer code and data that are used by the mobile device 10. The memory 12 may include Read-Only Memory (ROM), Random-Access Memory (RAM), a hard disk drive, and/or other non-transitory storage media. The operating system, other computer code, and data may also reside on a removable non-transitory storage medium that is loaded or installed onto the mobile device 10 when needed. Exemplary removable non-transitory storage media include CD ROM, PC-CARD, memory card, floppy disk, and/or magnetic tape.

The user interface system 14 includes one or more components capable of interacting with a user (e.g., receiving information from a user or outputting information to a user). As depicted in FIG. 1, the user interface system 14 includes a visual display 15. Typically, the visual display 15 is a touchscreen, which is capable of displaying visual information and receiving tactile commands from a user (e.g., selections made by touching the screen with a finger or a stylus, by pointing at a desired selection, or by looking at a desired selection for a predefined period of time). In addition to the visual display 15, the user interface system 14 may also include one or more speakers, buttons, keyboards, and/or microphones.

As noted, the mobile device 10 typically includes a wireless communication system 16. The wireless communication system 16 enables the mobile device 10 to communicate with a wireless network, such as a cellular network (e.g., a GSM network, a CDMA network, or an LTE network), a local area network (LAN), and/or an ad hoc network.

The camera 13 may be any device that is able to capture still photographs and/or video. Typically, the camera 13 is able to capture both still photographs and video. Although FIG. 1 depicts the mobile device 10 as having a single camera 13, it is within the scope of the present invention for the mobile device 10 to include more than one camera.

The processor 11 is typically in communication with a database 18. As depicted in FIG. 1, the database 18 may be stored within the memory 12. In an alternative embodiment depicted in FIG. 2, the processor 11 may access the database 18 via the wireless communication system 16. In other words, the processor may access the database 18 through the internet or a local area network via the wireless communication system 16.

The database 18 includes information associated with a code symbol. Typically, the database 18 includes information relevant to stock management and/or retail transactions. For example, the database 18 may include relevant information (e.g., name, price, size, associated barcode, stocking location, and/or quantity) regarding goods sold in a retail store. It will be appreciated by one of ordinary skill in the art that the processor 11 does not necessarily need to be in communication with a database 18. For instance, some code symbols (e.g., matrix barcodes) may contain all the necessary data, thereby eliminating a need for the processor 11 to look up associated data on a database 18.

Figure 4:
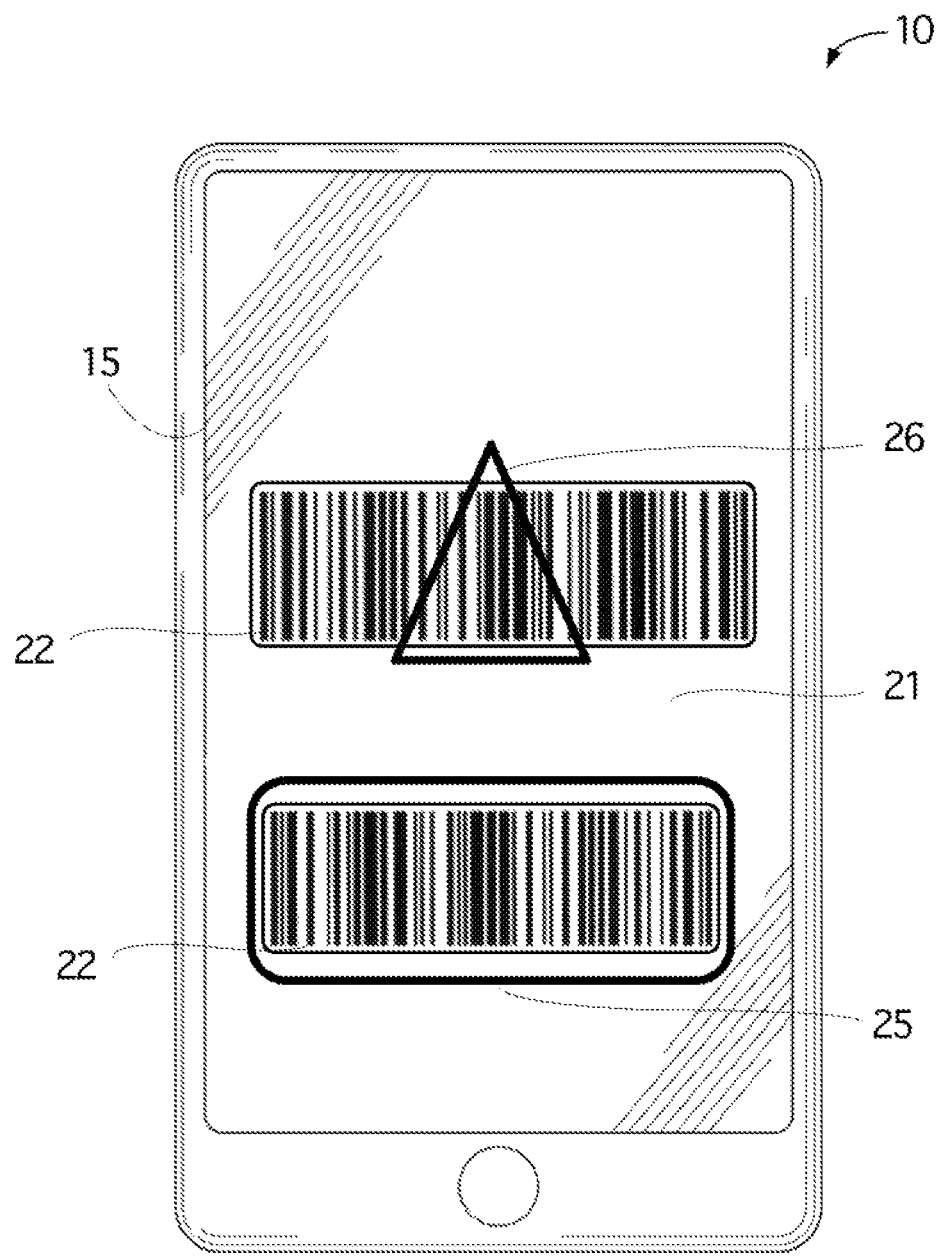
FIG. 4 is a graphic depiction of a user interface of a mobile device according to the present disclosure.

Turning now to FIGS. 4 and 5, which graphically depict an exemplary user interface of a mobile device 10 according to the present disclosure. To read a code symbol, the processor 11 is configured to capture an image from the camera 13 (e.g., after receiving a user command from the user interface 14 to begin a code symbol reading sequence). Typically the image will contain one or more code symbols 22. For example, an image 21 of a shipped package may show a shipping barcode and a product barcode. The processor 11 displays the image 21 on the visual display 15. Typically, the image 21 is a real-time video feed, which advantageously allows the user to determine what code symbols 22 will appear in the display by maneuvering the mobile device 10 to bring the desired code symbols 22 into the field of view of the camera 13. The processor 11 dynamically analyzes the displayed image 21 to determine whether a code symbol 22 in the image 21 is readable by the processor 11. A code symbol 22 is readable by the processor 11 if the processor is able to completely decode the code symbol 22. Typically, the processor 11 can verify that it has obtained a complete (e.g., accurate) decoding of a code symbol 22 by error detection means such as checksum functions. Various factors can contribute to the processor's inability to read a given code symbol 22. Some examples include marring of the code symbol 22, blurring of the image 21, an image 21 depicting only a portion of a code symbol 22, or another object obstructing the view of a portion of the code symbol 22. Because the processor 11 typically dynamically analyzes the image 21, a resolution of any of these factors can result in the processor 11 recognizing a previously unrecognized code symbol 22.

Whenever the processor 11 determines that a code symbol 22 in the image 21 is readable by the processor 11, the processor 11 displays on the visual display 15 a positive indicator 25 overlaying the code symbol 22 in the image 21. It will be understood that the term "overlaying" is not intended to mean that the positive indicator 25 completely obscures or covers the code symbol 22. Rather, the term "overlaying" is used to indicate the superimposing of a graphic (e.g., a positive indicator 25) over some or all of a code symbol 22, or in proximity to a code symbol 22, in a manner sufficient to associate the graphic with the code symbol 22 when viewed on the visual display 15. The positive indicator 25 may embrace a variety of different graphics, including a circle (e.g., a circle positioned near the center portion of the code symbol 22), a line (e.g., a line drawn substantially along the perimeter of the code symbol 22), a color highlight of some portion or all of the code symbol 22, or any other suitable graphic. When this positive indicator 25 is displayed in association with a code symbol 22, the user readily understands that the mobile device 10 is ready and able to read that code symbol 22, thereby alleviating uncertainty and improving the user experience.

FIG. 4 depicts an alternative embodiment of the mobile device 10 according to the present disclosure is graphically depicted. In this alternative embodiment, the processor 11 is further configured for displaying on the visual display 15 a negative indicator 26 overlaying the code symbol 22 in the image 21. The negative indicator 26 is displayed when the processor 11 is unable to properly read the code symbol 22. In this way, the user receives intuitive and dynamic feedback indicating that the code symbol 22 cannot be read under current conditions. Furthermore, this functionality serves to prompt the user in real-time to address any factors that may be contributing to the inability of the processor 11 to read the code symbol 22 (e.g., repair the code symbol 22, adjust the camera angle, adjust the camera focus). The negative indicator 26 may be any designated graphic suitable for conveying to the user that the associated code symbol 22 is not readable (e.g., exclamation point, caution symbol, triangle, etc.). To avoid confusion, the negative indicator 26 should be readily distinguishable from the positive indicator 25.

Another advantageous feature of an embodiment of the mobile device 10 according to the present disclosure is that it allows for selectively reading a code symbol 22 in response to input from a user. More particularly, in an alternative embodiment, the processor 11 is configured to read the code symbol 22 in the image in response to a selection input (e.g., a user-initiated direction to read a certain code symbol 22) received from the user interface system 14. When the processor 11 reads the code symbol 22, it both converts the code symbol 22 into data and outputs the data (e.g., to an application interface or to a memory). Typically, the user input is obtained via interaction with a touchscreen. Consequently, in one embodiment, the visual display 15 comprises a touchscreen. The user simply looks at the visual display 15 and selects the code symbol 22 to be decoded. The selection input is sent to the processor 11, which then reads the selected image. The resulting data may then be used by the processor 11 to obtain information corresponding to the code symbol 22 (e.g., by querying the database 18). This approach of allowing the user to select which code symbol 22 to read (e.g., by touching the code symbol 22 on the touch screen) greatly reduces user confusion, particularly when multiple code symbols 22 are in the field of view of the camera 13. Under prior systems, decoding in such a multi-code symbol environment often left the user uncertain as to which code symbol 22 was actually read by the mobile device 10. Allowing the user to select the code symbol 22 to read more closely approximates the use of a trigger on a traditional code reader system. This approach is both more intuitive, especially to users accustomed to a trigger-equipped code reader system, and more precise.

It is within the scope of the present disclosure for the foregoing steps of the disclosed method of reading a code symbol with a mobile device—namely the steps of (i) providing a mobile device 10 having a camera 13, a user interface system 14 having a visual display 15, and a processor 11 communicatively coupled to the camera 13 and the user interface system 14; (ii) capturing with the camera 13 an image 21 including a code symbol 22; (iii) displaying the image 21 on the visual display 15; (iv) determining with the processor 11 whether the code symbol 22 is readable by the processor 11; and (v) displaying on the visual display 15 a positive indicator 25 overlaying the code symbol 22 when the processor 11 determines that the code symbol 22 is readable by the processor—to be interrupted by another process on the mobile device 10. For example, these steps may be interrupted if the mobile device 10 receives a phone call. During the interruption, these steps may be paused or continued in the background of the mobile device 10. Once the interruption has concluded (e.g., the call has ended), these steps may be resumed and/or returned to the foreground of the mobile device 10.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912, 262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); and U.S. patent application Ser. No. 13/927,398 for a Code Symbol Reading System Having Adaptive Autofocus, filed Jun. 26, 2103 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system, comprising:
   a camera;
   a user interface system comprising a visual display; and
   a processor communicatively coupled to the camera and the user interface system, the processor being configured for:
   capturing from the camera an image depicting at least one code symbol;
   displaying the image on the visual display;
   determining whether the at least one code symbol in the image is readable by the processor; and
   displaying on the visual display a visual indicator overlaying the at least one code symbol in the image in response to determining whether the at least one code symbol in the image is readable by the processor.

2. The system of claim 1, wherein the at least one code symbol comprises a barcode symbol.

3. The system of claim 1, wherein the visual indicator comprises a circle.

4. The system of claim 1, wherein the visual indicator comprises a line drawn substantially along the perimeter of the at least one code symbol.

5. The system of claim 1, wherein the visual indicator comprises a color highlight of the at least one code symbol.

6. The system of claim 1, wherein the processor is configured for displaying on the visual display a negative indicator overlaying the at least one code symbol in the image when the processor determines that the at least one code symbol in the image is not readable by the processor.

7. A method, comprising:
   providing a system having a camera, a user interface system having a visual display, and a processor communicatively coupled to the camera and the user interface system;
   capturing with the camera an image including a code symbol;
   displaying the image on the visual display;
   determining with the processor whether the code symbol is readable by the processor; and
   displaying on the visual display a visual indicator overlaying the code symbol in response to determining with the processor whether the code symbol is readable by the processor.

8. The method of claim 7, comprising:
   reading the code symbol with the processor in response to a selection input from the user interface system.

9. The method of claim 8, wherein the visual display comprises a touchscreen and the selection input is initiated by a user's tactile command selecting the code symbol in the image appearing on the touchscreen.

10. The method of claim 7, comprising:
    displaying on the visual display a negative indicator overlaying the code symbol when the processor determines that the code symbol is not readable by the processor.

11. The method of claim 7, wherein the code symbol comprises a barcode symbol.

12. The method of claim 7, wherein the visual indicator comprises a circle.

13. The method of claim 7, wherein the visual indicator comprises a line drawn substantially along the perimeter of the code symbol.

14. The method of claim 7, wherein the visual indicator comprises a color highlight of the code symbol.

15. A system, comprising:
    a camera;
    a user interface system comprising a touchscreen; and
    a processor communicatively coupled to the camera and the user interface system, the processor being configured for:
    capturing from the camera an image depicting at least one code symbol;
    displaying the image on the touchscreen;
    determining whether the at least one code symbol in the image is readable by the processor;
    displaying on the touchscreen a visual indicator overlaying the at least one code symbol in the image in response to determining whether the at least one code symbol in the image is readable by the processor; and
    reading a code symbol selected from the at least one code symbol in the image in response to a selection input received from the user interface system.

16. The system of claim 15, wherein the selection input is initiated by a user's tactile command selection of the at least one code symbol in the image appearing on the touchscreen.

17. The system of claim 16, wherein the tactile command comprises touching the at least one code symbol on the touchscreen with the user's finger.

18. The system of claim 16, wherein the tactile command comprises pointing at the at least one code symbol on the touchscreen.

19. The system of claim 16, wherein the tactile command comprises touching the at least one code symbol on the touchscreen with a stylus.

20. The system of claim 16, wherein the tactile command comprises looking at the at least one code symbol on the touchscreen for a predetermined period of time.

* * * * *